US012702218B2

(12) United States Patent
Bohmbach et al.

(10) Patent No.: US 12,702,218 B2
(45) Date of Patent: Aug. 11, 2026

(54) TETHERING POINT SYSTEM

(71) Applicant: Tenacious Holdings, Inc., St. Paul, MN (US)

(72) Inventors: Nathan Bohmbach, Lakeville, MN (US); William Baronti, Arlington Heights, IL (US); Carl Behlmer, Wheaton, IL (US); Kevin Ekdahl, Libertyville, IL (US)

( * ) Notice: Subject to any disclaimer, the term of this patent is extended or adjusted under 35 U.S.C. 154(b) by 660 days.

(21) Appl. No.: 17/944,451

(22) Filed: Sep. 14, 2022

(65) Prior Publication Data

US 2024/0081514 A1 Mar. 14, 2024

(51) Int. Cl.
*A45F 5/00* (2006.01)
*B25G 1/00* (2006.01)

(52) U.S. Cl.
CPC . *A45F 5/00* (2013.01); *B25G 1/00* (2013.01)

(58) Field of Classification Search
CPC ........ A45F 5/021; A45F 5/1575; B25B 23/16; B25G 1/01; B25G 1/043; B25G 1/102–105
See application file for complete search history.

(56) References Cited

U.S. PATENT DOCUMENTS

| | | | | | |
|---|---|---|---|---|---|
| 5,033,142 | A * | 7/1991 | Templeton | B63C 11/52 | 224/222 |
| 5,195,212 | A * | 3/1993 | Colwell | B25G 1/10 | 16/DIG. 12 |
| 5,873,148 | A * | 2/1999 | Arnold | B25G 1/102 | 81/177.1 |
| 11,191,347 | B1 * | 12/2021 | Krivda | B25G 1/105 | |
| 2003/0233718 | A1 * | 12/2003 | Heathcock | B25G 3/16 | 15/144.4 |

* cited by examiner

*Primary Examiner* — Tyrone V Hall, Jr.
(74) *Attorney, Agent, or Firm* — Skaar Ulbrich Macari, P.A.

(57) ABSTRACT

A reusable device for securing to and providing a tethering point for a tool to assist a user in preventing dropping of the tool, to help a user retrieve a dropped tool or to assist a user from losing a tool. Where the device is hollow with a removable rotating cap and a body with a wider top end and a smaller exit port at the other end. The hand tool is inserted from the top into the wider end and the blade of the tool passes through and is secured by the exit port. The body is trimmable to accommodate various handle lengths. The device also provides a refreshed grip for worn out tool handles.

9 Claims, 6 Drawing Sheets

TETHERING POINT SYSTEM

FIELD OF THE INVENTION

The Tethering Point System relates a device for retrofitting an anchor or tethering point to a hand tool or other handheld item for tethering that item to a user.

BACKGROUND

The need to tether hand tools or other handheld items to a user, especially to a user working at heights, is a necessary safety precaution. Falling hand tools or other handheld items pose a risk of injury or death to those below. In addition to the risk of injury is the risk of damage these falling handheld objects pose to property or the environment. An example of a prior art tool tether is found in U.S. Pat. No. 8,646,768. The device of the '768 patent is inserted over the top of the non-working end of a hand tool. Once slipped over the top, a loop at the top of the device is used to tether the hand tool or other object to a user. The problem with this type of tether system is that the tool or other object can fall out of the device the same way the tool went into the device, out of the bottom of the device. Further, there is no inherent way to modify the device for different length tool handles. Further, the placement of the attachment loop interferes with a user's ability to apply any needed pressure to the end of the hand tool, as the loop interferes with any such attempt. There is a need for a better and safer tethering point system.

SUMMARY OF THE INVENTION

The Tethering Point System disclosed provides a cylindrical case made of rubber or other material with a high coefficient of friction. The case has a removeable cap at one end and an exit port at the other. The diameter of the cylinder is variable and the length is modifiable in situ as need by trimming or cutting of the cylinder. The cap is removeably secured to the open end of the cylinder. The cap has a rotating top surface with a loop for tethering attached. The cap loop projects from a side of the rotating cap portion for attaching a line, carabineer, clip or the like to the system. The flat or semi-domed cap surface allows pressure to be applied without interfering with any tethering functionality. The cap rotates to allow the cap and cap loop to maintain its orientation during use.

BRIEF DESCRIPTION OF THE DRAWINGS

The accompanying drawings, which are incorporated into and constitute a part of this specification, illustrate one or more embodiments of the present disclosure and, together with the detailed description, serve to explain the principles and implementations of this disclosure.

DESCRIPTION OF THE PREFERRED EMBODIMENT

Figure 1:
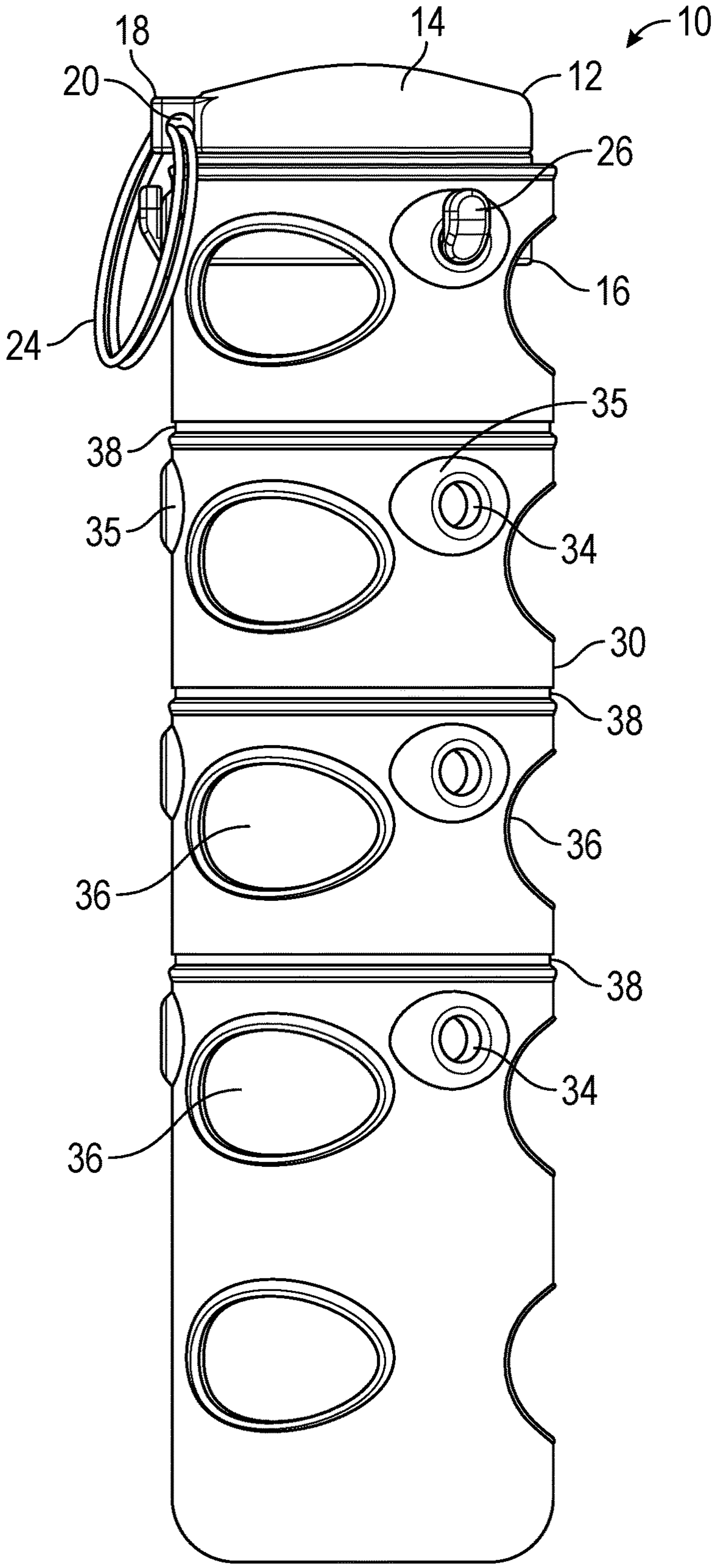
FIG. 1 illustrates the tethering point system in a front elevation view.

The preferred embodiment disclosed below refers generally to use of the Tethering Point System with hand tools. It should be noted that the system can be adapted to most handheld objects such as flashlights, pens, laser pointers, markers, etc. The tethering point system not only provides a useful device to retrofit a hand tool with a means for tethering, but may also serve as a replacement for worn or missing tool grips.

Referring to the figures, tethering point system 10 is depicted. Tethering point system 10 comprises removable cover 12 and body 30. Removable cover 12 comprises cap 14, loop stud 18 that defines aperture 20, pegs 26 and base 16. Loop 24 attaches to cover 12 via loop stud 18 through aperture 20. It should be noted that other attachment methods can be attached to tethering system 10 via aperture 20, such as a line, a carabineer or the like. Cap 14 of cover 12 rotates with respect to base 16.

Figure 3:
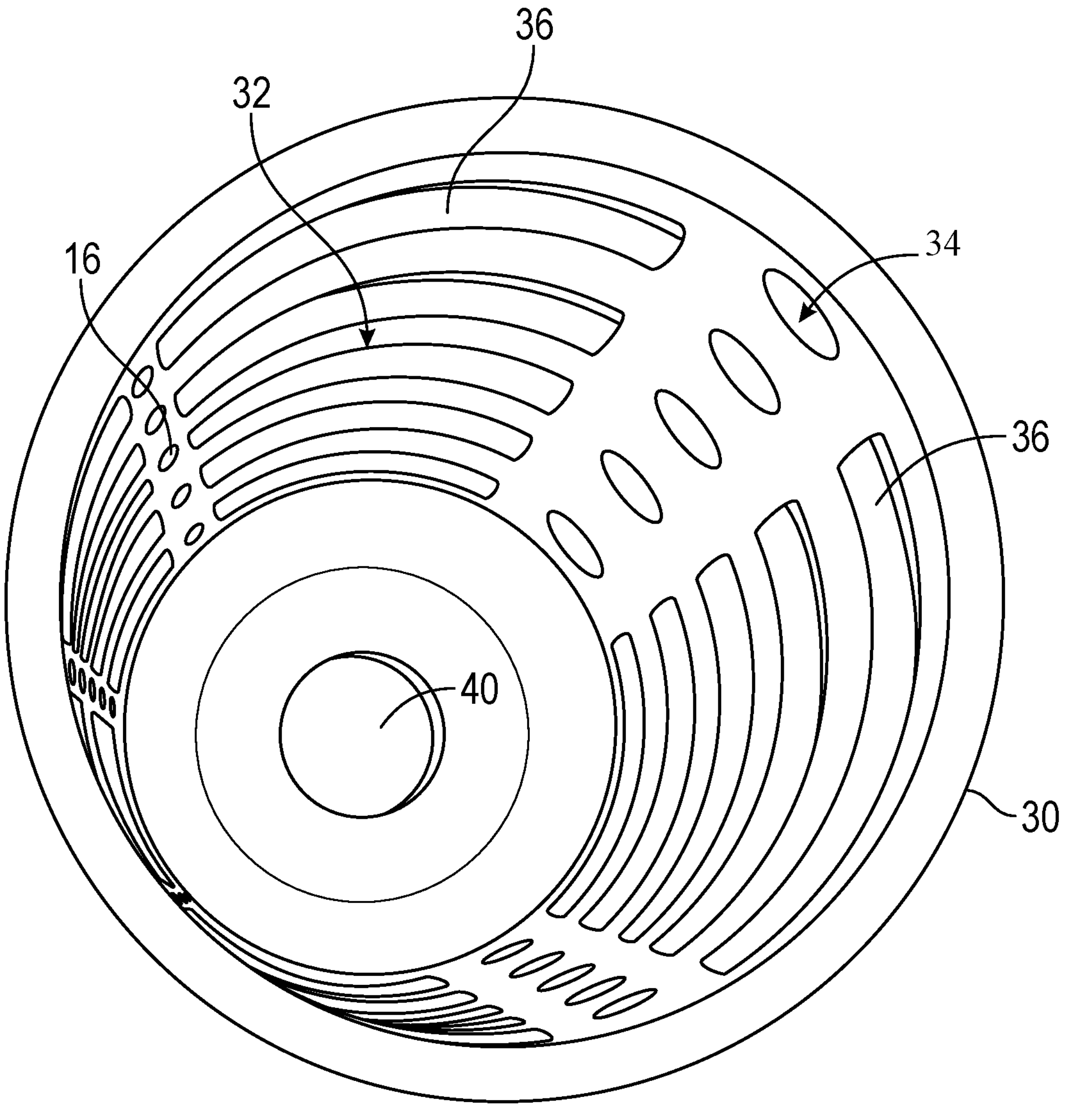
FIG. 3 illustrates the tethering point system with the cover removed showing the cap opening and the exit port.

Body 30 of tethering point system 10 is preferably cylindrical in shape and comprises cap opening 34, peg holes 34, peg reinforcement 35, grip openings 36, trim channels 38 and exit port 40 (see FIG. 3 for view of exit port 40). Pegs 26 are preferably hook shaped to allow a secure fitment into peg holes 34. Peg holes 34 preferably comprise reinforced area 35 to prevent pegs 26 from breaking free of body 30 during a drop. Body 30 is preferably constructed of a rubber or other material with a high coefficient of friction.

Body 30 can be manufactured in different diameters to accommodate a range of tool handle diameters. Likewise, exit port 40 can be manufactured with diameters that accommodate various size screwdriver blades, nut driver blades, or other items. Exit port 40 is also flexible and can deform to accommodate and secure tool shaft sizes of varying diameters. Grip openings 36 are laid out such that they provide an ergonomic area for gripping tethering point system 10 when in use. Grip openings 36 also assists the use of tethering point system 10 by allowing any potential buildup of pressure from inserting a hand tool into tethering point system 10 to escape.

Figure 2:
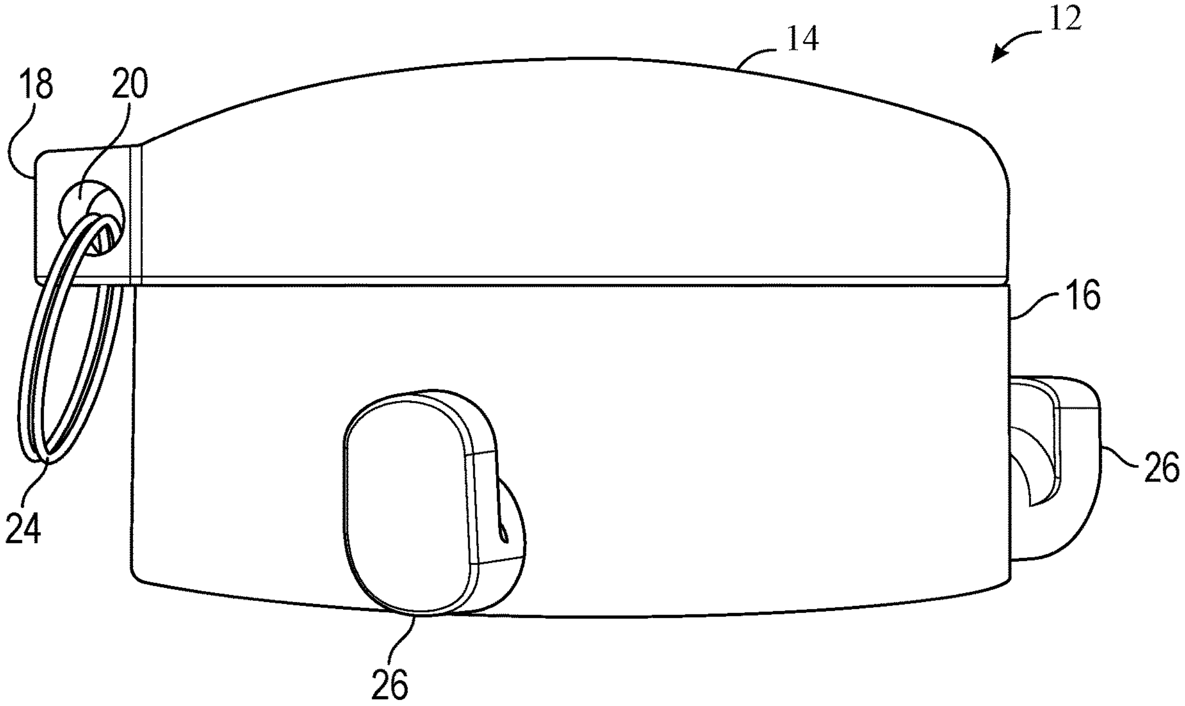
FIG. 2 illustrates the cover of the tethering point system depicting the attachment loop and pegs used to secure the covering into the body of the tethering point system.

Referring to FIG. 2, cover 12 is depicted detached from body 30. Cap 14 of cover 12 is preferably flat or slightly domed. This leaves an area for which hand pressure can be applied to the end of tether point system 10 to assist in driving, for example, a nut or screw without interfering with any tethering mechanism. Cap 14 also rotates with respect to base 16, which assists in driving a nut or screw using axial pressures while rotating tethering system 10. Pegs 36 are preferably at least three in number and preferably comprise reinforcement area 35. This ensures that cover 12 will remain in place even when tether point system 10 is dropped during use. Cap 14 of cover 12 rotates with respect base 16 via shaft 42 which extends axially from the bottom center of cap 14 into base 16 where it is pinned to allow rotation (not shown).

FIG. 3 is a top perspective view of body 30 with cover 12 removed, exposing cap opening 32 and exit port 40.

Figure 4:
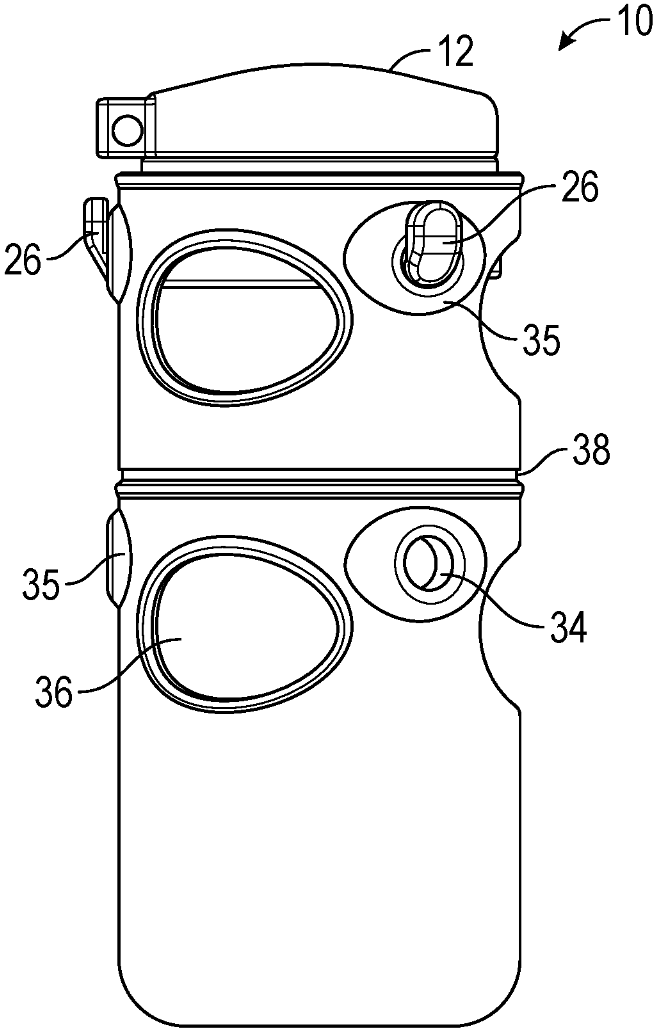
FIG. 4 illustrates the tethering point system that has been trimmed to a shorter length and the cover re-secured.

FIG. 4 illustrates tethering point system 10 that has been shortened by trimming at a trim channel 38. This allows tethering point system 10 to be utilized with various length tool handles. Body 30 comprises peg holes 34 that are mutually aligned with pegs 26 of cover 12. The pattern of peg holes 34 are repeated below each trim channel to allow the secure attachment of cover 12 no matter which trim channel 38 is used to fit tethering point system 10 to the hand tool to be utilized.

Figure 5:
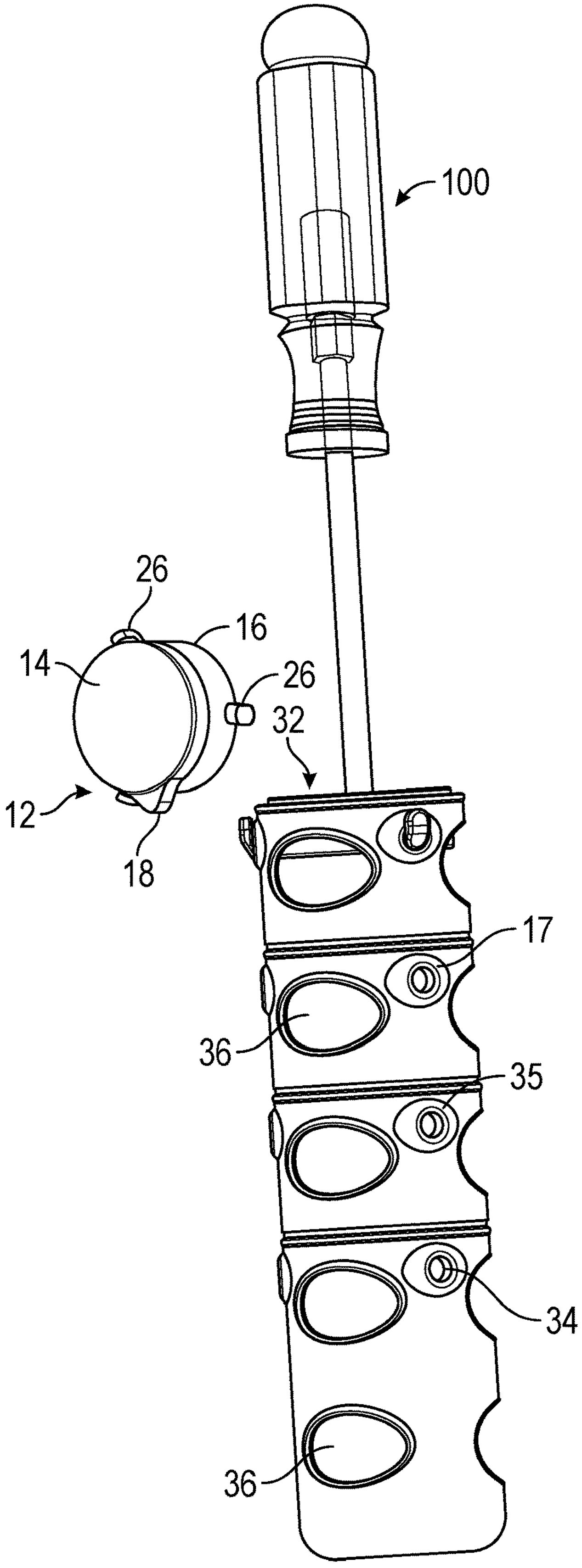
FIG. 5 illustrates the tethering point system with the cover removed showing the insertion of a screw driver from the top side.
Figure 6:
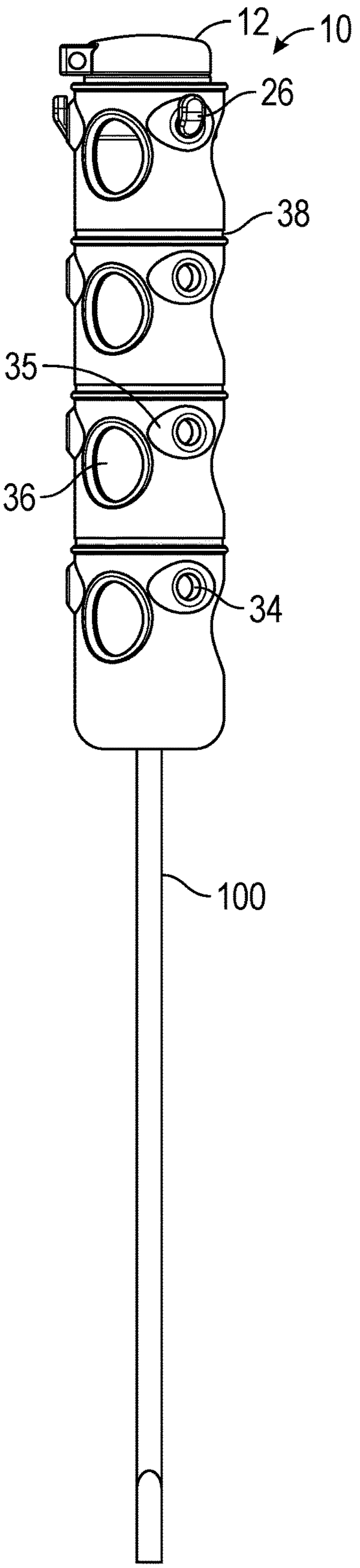
FIG. 6 illustrates the tethering point system with the screw driver fully captured by the tethering point system.

Referring to FIGS. 5 and 6, to use tether point system 10, cover 12 is removed. After ensuring the diameter of body 30 provides a snug fit for the handle diameter of the hand tool to be utilized, the hand tool is place blade first into opening 32. The blade is inserted through exit port 40 until the base of the hand tool reaches the exit port end of body 30. If the top of the handle of the hand tool is below a trim point 38, body 30 is trimmed at the closest trim point 38 while still above the top the handle of hand tool 100. Cover 12 is then secured to body 30 by inserting pegs 26 of cover base 16 in to peg holes 34.

We claim:

1. A tethering point system for a hand tool comprising:

a body having a generally cylinder shape, the body having a side wall having a length, a diameter, a top base, a bottom base, the side wall having one or more peg holes formed therein, the top base defining an opening with a diameter that is approximately equal to the diameter of the body, the bottom base defining an opening with a diameter less than the diameter of the diameter of the top base;

a cover having a cylinder shape, the cover having a diameter approximately equal to the radius of the top base, the cover comprising a cap portion and a cap base portion, the cap portion having a smooth upper surface, the cap portion having a side surface comprising an extension that defines a tethering aperture, the cap portion rotationally attached to the cap base portion, the cap base portion having a side surface having one or more hooked pegs extending therefrom and configured for being removably mated with the one or more peg holes, and wherein the cap base portion is releasably securable to the top base.

2. The tethering point system of claim 1 wherein the side wall defines at least two gripping apertures.

3. The tethering point system of claim 1 wherein the one or more hooked pegs extending from the cap base side surface extend from the cap base toward the cap portion.

4. The tethering point system of claim 1 wherein the body comprises trim channels that allow for removal of body material to shorten the length of the body.

5. A tethering point system for a hand tool comprising:

a body having a generally cylinder shape, the body having a side wall having a length and a diameter, a top base, a bottom base, the side wall having one or more peg holes formed therein, the top base defining an opening with a diameter that is approximately equal to the diameter of the body, the bottom base defining an opening with a diameter less than the diameter of the diameter of the top base, wherein the body comprises one or more trim channels that allow for removal of body material to shorten the length of the body;

a cover having an upper cap portion and a lower base portion, the upper cap portion having a smooth top surface and a side surface, the upper cap portion side surface having an extension therefrom that defines a tether aperture, the base portion having a side surface having one or more hooked pegs extending therefrom that are removably mateable with the one or more peg holes, wherein the lower base portion is releasably securable to the body.

6. The tethering point system of claim 5 wherein the upper cap portion is rotatably secured to the lower base portion.

7. A tethering point system for a hand tool comprising:

a body having a generally cylinder shape, the body having a side having a length and a diameter, the body having one or more peg holes formed therein, the body further defining an interior, a top base, a bottom base, the top base defining an opening with a diameter that is approximately equal to the diameter of the body, the bottom base defining an exit port with a diameter less than the diameter of the diameter of the top base, wherein the body is adapted to accept a hand tool into the top base opening and to secure the handle of the handle tool within the interior of the body with a blade of the handle tool exiting the body through the exit port;

a cover having an upper cap portion and a lower base portion, the upper cap portion having a smooth top surface and a side surface, the upper cap portion side surface having an extension therefrom that defines a tether aperture, the base portion having a side surface having one or more hooked pegs extending therefrom that are removably mateable with the one or more peg holes, wherein the lower base portion is releasably securable to the body.

8. The tethering point system of claim 7 wherein the upper cap portion is rotatably secured to the lower base portion.

9. The tethering point system of claim 7 wherein the body comprises trim channels that allow for removal of body material to shorten the length of the body.

* * * * *